United States Patent
Herley

(10) Patent No.: US 7,333,864 B1
(45) Date of Patent: Feb. 19, 2008

(54) SYSTEM AND METHOD FOR AUTOMATIC SEGMENTATION AND IDENTIFICATION OF REPEATING OBJECTS FROM AN AUDIO STREAM

(75) Inventor: Cormac Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1165 days.

(21) Appl. No.: 10/177,298

(22) Filed: Jun. 22, 2002

Related U.S. Application Data

(60) Provisional application No. 60/319,290, filed on Jun. 1, 2002.

(51) Int. Cl.
G06F 17/00 (2006.01)
H04R 29/00 (2006.01)
(52) U.S. Cl. .......................................... 700/94; 381/58
(58) Field of Classification Search ................. 700/94; 381/58; 84/600–606, 609–612, 615–618, 84/634–636, 649–656, 666–668; 369/4
See application file for complete search history.

(56) References Cited

U.S. PATENT DOCUMENTS 6,910,035 B2* 6/2005 Hoekman et al. .............. 707/4

* cited by examiner

Primary Examiner—Sinh Tran
Assistant Examiner—Andrew C Flanders
(74) Attorney, Agent, or Firm—Lyon & Harr, LLP; Mark A. Watson

(57) ABSTRACT

The "repeating object extractor" described herein automatically segments and identifies audio objects such as songs, station identifiers, jingles, advertisements, emergency broadcast signals, etc., in an audio stream. The repeating object extractor performs a computationally efficient joint segmentation and identification of the stream even in an environment where endpoints of audio objects are unknown or corrupted by voiceovers, cross-fading, or other noise. Parametric information is computed for a portion of the audio stream, followed by an initial comparison pass against a database of known audio objects to identify known audio objects which represent potential matches to the portion of the audio stream. A detailed comparison between the potential matches and the portion of the audio stream is then performed to confirm actual matches for segmenting and identifying the audio objects within the stream, an alignment between matches is then used to determine extents of audio objects in the audio stream.

69 Claims, 3 Drawing Sheets

SYSTEM AND METHOD FOR AUTOMATIC SEGMENTATION AND IDENTIFICATION OF REPEATING OBJECTS FROM AN AUDIO STREAM

CROSS REFERENCE TO RELATED APPLICATIONS

This application claims the benefit of a previously filed provisional patent application Ser. No. 60/319,290 filed on Jun. 1, 2002.

BACKGROUND

1. Technical Field

The invention is related to identification of repeating objects or music in an audio stream, and in particular, to a system and method for jointly segmenting and identifying repeating objects from one or more broadcast audio streams.

2. Related Art

There are many existing schemes for identifying audio objects such as particular advertisements, station jingles, or songs embedded in an audio stream. For example, several such audio identification schemes are referred to as "audio fingerprinting" schemes. Typically, audio fingerprinting schemes take a known audio object, and reduce that object to a set of parameters, such as, for example, frequency content, energy level, etc. These parameters, or "fingerprints," are then stored in a database of known objects. Sampled portions of the streaming audio are then compared to the fingerprints in the database for identification purposes.

Consequently, such schemes typically rely on a comparison of the audio stream to a large database of previously identified audio objects. In operation, such schemes often sample the audio stream over a desired period using some sort of sliding window arrangement, and compare the sampled data to the database in order to identify potential matches. In this manner, individual objects in the audio stream can be identified. This identification information is typically used for any of a number of purposes, including segmentation of the audio stream into discrete objects, or generation of play lists or the like for cataloging the audio stream, or gathering statistics on the stream. However, as the size of the fingerprint database increases, it becomes increasingly computationally expensive to identify matching audio objects in the audio stream.

Further, many existing audio identification schemes require accurate registration at the beginning and end of the audio object being identified. Consequently, such schemes tend to work poorly in real world environments such as broadcast radio stations, where songs are often foreshortened, cross-faded with other songs at the beginning and endpoints, or corrupted by voiceovers, station identifiers, or other noise.

Therefore, what is needed is a computationally efficient system and method for identifying and segmenting audio objects, such as songs, station identifiers, jingles, advertisements, emergency broadcast signals, etc., from an audio stream such as a broadcast radio or television signal. Further, such a system and method should be robust in real-world type environments where the endpoints of audio objects are unknown, corrupted, or otherwise noisy.

SUMMARY

A "repeating object extractor" as described herein automatically segments and identifies audio objects such as songs, station identifiers, jingles, advertisements, emergency broadcast signals, etc., in an audio stream comprised of repeating and non-repeating audio objects. Unlike conventional schemes, instead of trying to segment the audio stream into audio objects first, and then attempting to identify the segments, the repeating object extractor performs a joint segmentation and identification of the stream. This joint segmentation and identification provides a computationally efficient technique identifying and segmenting audio objects in an audio stream, even in an environment where the endpoints of audio objects are unknown or corrupted by voiceovers, cross-fading, or other noise.

In general, an audio stream is captured using conventional methods from an audio or audio/video broadcast via radio, television, the Internet, or other network, then either saved to a computer readable medium, or buffered for a period of time, typically several minutes or longer, sufficient to allow for semi real-time identification of repeating objects within the audio stream. The audio stream, either buffered or read from a stored location is then processed in segments, or windows. While discrete windows can be used, the use of overlapping or sliding windows to segment the audio stream for analysis provides better results. In either case, when processing a segment of the audio stream, it is assumed that the segment represents a part of one of the entries in a preexisting database of audio objects.

The segment is first filtered or processed to provide a vector of at least one representative parameter for characterizing the segment. Note that this vector of parameters continues to evolve as a function of time. In particular, so long as the computed parameters are approximately constant, it is assumed that contiguous windows of the audio stream represent a part of the same audio object. Conversely, discontinuities in the computed parameters are assumed to correspond to approximate audio object boundaries. As a result, the vector of characteristic parameters represents one or more contiguous segments of the audio stream.

A first comparison pass against the database then serves to eliminate as many of the entries as possible from further consideration, while returning other audio objects which represent potential matches. Once this has been done, more complex comparison methods are used to check the segment or segments against each of the possible matching entries in the database. Consequently, the approach described herein represents an easy-to-hard refinement approach to narrow the search of the database.

In particular, in processing the audio stream a set of at least one filter, which produces representative information about the window or data currently being processed, is applied to the audio stream. Thus, given a number of filters, an output vector including elements for each filter is produced for one or more contiguous windows of the audio stream. In other words, given one or more windows of the audio stream, the set of at least one filter produces a vector of outputs comprised of characteristic information which represents the audio data in those windows. This output vector is then used to identify potential audio object matches.

As is well known to those skilled in the art, there are a large number of conventional frequency, time, and energy-based techniques for comparing the similarity of audio objects. For example, the elements representing the output vector for song-type audio objects includes, but is not limited to, information, such as, for example, beats per minute (BPM), energy occupancy of various frequency bands, zero-crossings, etc., as estimated or calculated over each current window.

Once the output vector has been computed, it is passed to the database to determine whether any existing entries are possible matches. When potentially matching entries are located in the database, more detailed information regarding each potentially matching entry is provided for further comparison and analysis in order to help make a positive identification and segmentation of a portion of the audio stream. In particular, when the initial search identifies possible candidates that approximately match the output vector, a more detailed "match vector" of information for each possibly matching audio object is returned for a comparison to the target portion of the audio stream. This match vector contains information such as, for example, a low-dimension version of the audio object, its duration, and other pertinent quantities, such as, for example, title and artist information.

For each match vector a cross-correlation of the low-dimension version of the audio object is performed with the appropriate portion of audio from the audio stream. A high correlation denotes a match, with the peak of the correlation providing alignment information, that, when considered with the audio object duration information, allows for a more exact determination of the likely boundaries of the audio object in the stream.

In one embodiment, the match vector for each possible match is compared against the target segment or segments of the audio stream in order of decreasing probability of match until a match is identified. Performing comparisons in decreasing probability of match serves to decrease overall computation time and thus increases overall system efficiency. Several factors are used in assigning a probability of match. For example, higher probabilities are assigned to those match vectors that correspond to closer matches to output vector in the aforementioned initial comparison. In addition, in another embodiment, prior information, such as the most recently identified audio objects from the same audio stream, is used to modify match vector probabilities. For example, if a song of one genre was the most recently identified, it is more probable that a song of the same genre is being played. Consequently, a higher probability will be assigned to possible song matches of the same genre than to possible song matches of different genres.

In one embodiment, once a positive match has been found, the search terminates, the segmentation is completed, and the audio object is stored along with its meta-data. Alternately, the starting and ending points of the audio object within the audio stream is stored in a file or database so that the audio object can be accessed as desired, or so that statistics regarding audio object play can be maintained.

If an identified audio object has already been stored it need not be stored again. However, if the existing stored copy is imperfect, for example being cropped or marred in some way, such as by crossfading, voiceovers, or other noise, the newly identified copy is stored in its place if it is better. Alternately, in another embodiment, each copy, or pointers to the location of each copy in the audio stream are stored individually. In still another embodiment, two or more copies of an audio object are combined to produce an improved version of the audio object. For example, if a stored copy of a particular song is cropped (e.g., missing some seconds at the beginning and end) and there is a voiceover on part of it, a second copy of the song is used in one embodiment to produce an improved version of the song using conventional audio processing techniques.

In addition to the just described benefits, other advantages of the system and method for automatically identifying and segmenting audio objects in an audio stream will become apparent from the detailed description which follows hereinafter when taken in conjunction with the accompanying drawing figures.

DESCRIPTION OF THE DRAWINGS

The specific features, aspects, and advantages of the repeating object extractor will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
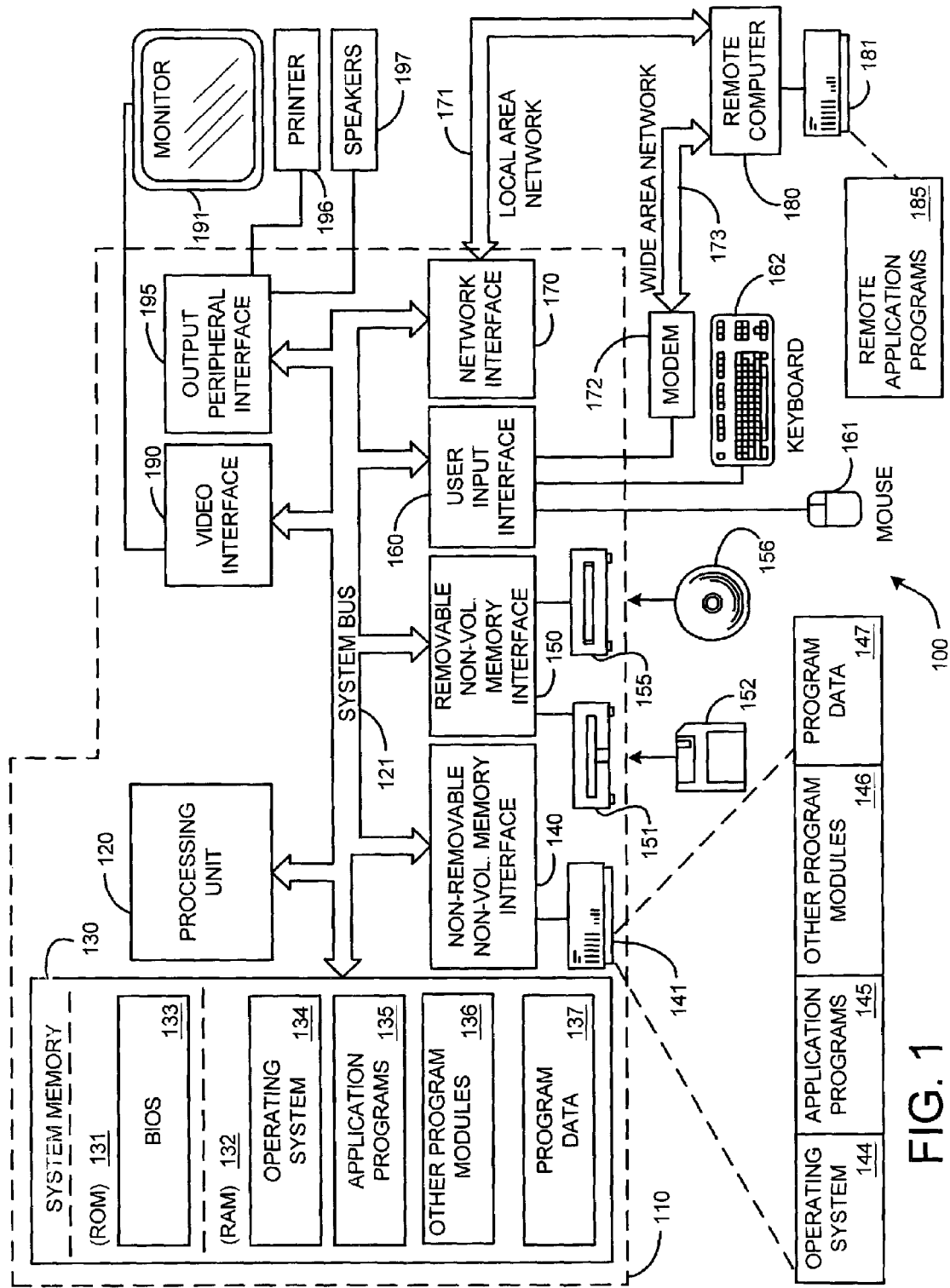
FIG. 1 is a general system diagram depicting a general-purpose computing device constituting an exemplary system for automatically identifying and segmenting audio objects in an audio stream.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 120 through a user input interface 160 that is coupled to the system bus 121, but may be connected by other interface and bus structures, such as, for example, a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying a system and method for automatically identifying and segmenting audio objects such as songs, station identifiers, jingles, advertisements, emergency broadcast signals, etc., in an audio stream.

2.0 Introduction

A "repeating object extractor" as described herein automatically jointly segments and identifies audio objects such as songs, station identifiers, jingles, advertisements, emergency broadcast signals, etc., in an audio stream comprised of repeating and non-repeating audio objects. Unlike conventional schemes, instead of trying to segment the audio stream into audio objects first, and then attempting to identify the segments, the repeating object extractor performs a joint segmentation and identification of the stream.

Audio objects in an audio stream, such as a radio broadcast, are often corrupted by voice-overs at the beginning and/or end point of each object. Further, such objects are frequently foreshortened, i.e., they are not played completely from the beginning or all the way to the end. Additionally, such objects are often intentionally distorted. For example, audio broadcast via a radio station is often processed using compressors, equalizers, or any of a number of other time/frequency effects. Further, audio objects, such as music or a song, broadcast on a typical radio station are often cross-faded with the preceding and following music or songs, thereby obscuring the audio object start and end points, and adding distortion or noise to the object. Such manipulation of the audio stream is well known to those skilled in the art. Finally, it should be noted that any or all of such corruptions or distortions can occur either individually or in combination.

The joint segmentation and identification of audio objects, as described herein, provides a computationally efficient technique for jointly identifying and segmenting audio objects in an audio stream, even in an environment where the endpoints of audio objects are unknown or corrupted by voiceovers, cross-fading, or other noise.

2.1 System Overview

The system and method described herein for automatically identifying and segmenting songs, music, and other audio objects in an audio stream provides many advantages, including, for example, the ability to automatically identify audio objects in one or more audio streams, the ability to store either all identified audio objects, or to store only desirable audio objects or content from the audio stream, the ability to identify targeted audio objects for special processing, the ability to de-noise, or otherwise clear up any multiply detected audio object, or the ability to select or reject specific audio objects for listening, saving, or special processing.

In general, an audio stream is first captured using conventional methods from an audio or audio/video broadcast via radio, television, the Internet, or other network. Once captured, the audio stream is then either saved to a computer readable medium, or buffered for a period of time, typically several minutes or longer, sufficient to allow for semi real-time identification of audio objects within the audio stream. The audio stream, either buffered or read from a stored location, is then processed in segments, or windows. While discrete windows can be used, the use of overlapping or sliding windows to segment the audio stream for analysis tends to provide better identification results. In either case, when processing a segment of the audio stream, it is assumed that the segment represents a part of one of the entries in a preexisting database of audio objects.

Each segment of the audio stream is filtered or processed to provide a vector of at least one representative parameter for characterizing the segment. Note that this vector of parameters continues to evolve as a function of time. In one embodiment, so long as the computed parameters are approximately constant, it is assumed that contiguous windows of the audio stream represent a part of the same audio object. Conversely, discontinuities in the computed parameters are assumed to correspond to approximate audio object boundaries. As a result, the vector of characteristic parameters, i.e., the "output vector," represents one or more contiguous segments of the audio stream.

A first comparison pass, or query, against the database then serves to eliminate as many of the entries as possible from further consideration, while returning other audio objects that represent potential matches to the output vector. Once this has been done, more complex comparison methods are used to check the segment or segments against each of the possible matching entries in the database. Consequently, the approach described herein represents an easy-to-hard refinement approach to narrow the search of the database.

2.2 Object Database

As noted above, the object database contains parametric information for characterizing each known audio object. Further, also as noted above, this parametric information is used to identify potential audio object matches. In addition, the object database contains more detailed information for each known audio object for use in making detailed comparisons between each potential match and the audio windows or segments from the audio stream that are being analyzed.

As discussed below in Section 2.3, the parametric information includes elements representing the output vector. For example, assuming that the audio object represents a song, then the parametric information includes elements such as, for example, beats per minute (BPM), energy occupancy of various frequency bands, zero-crossings, etc., as estimated or calculated over each current window. Also as discussed in Section 2.4, the detailed information comprises a "match vector" $G_i$, which contains information such as, for example, a low-dimension version of the audio object, its duration, and other pertinent quantities, such as title and artist information.

Given each of these information types, i.e., parametric and detailed, the database performs some or all of the functions discussed below in accordance with the alternate embodiments described herein. First, the database receives an output vector, $F_j$, for the portion of the audio stream currently being analyzed and determines which audio objects are possible matches. Second, in response to receipt of the output vector $F_j$, the database provides vectors $G_i$ for each potential match to allow for joint identification and segmentation of the audio object from the audio stream. Third, in further embodiments, the database maintains popularity statistics such as how often particular audio objects are identified or played, the times that particular objects were played, etc. Further, in one embodiment, the $G_i$ vectors are provided in order of decreasing likelihood, with the most popular or probable audio objects being provided first for the detailed comparison.

In alternate embodiments, for each known or previously identified audio object, the parametric information and the more detailed information, i.e., the match vector, are separated into one or more separate databases, which in further alternate embodiments reside either on a local client computer, or on a remote server computer that is accessible via conventional network or Internet protocols. The use of separate databases provides several advantages. For example, separate databases for different music genres are maintained in one embodiment, thereby reducing search and comparison times when interested in particular genres.

Further, the use of remote databases comprised of parametric and detailed information for very large numbers of audio objects is useful for identifying audio objects when local storage of such databases would be prohibitive due to space constraints. In addition, use of such a remote database provides a central database that needs only be updated once for use by multiple clients rather than individually for each client. Remote database queries involving interaction between clients and servers is well known to those skilled in the art, and will not be addressed here. In addition, for clarity of discussion, a single database will be referred to throughout this discussion as including both the parametric information for each known object, and the detailed information for object comparisons.

In view of the preceding discussion, it is clear that interaction with the database can take several forms. For example, in one embodiment, the entire database is located on a remote server that is accessible to one or more clients using conventional communications protocols. In another embodiment, at least part of the database is located locally on a client computer, and whenever an audio object cannot be identified locally, a query to a remote database is made. In a related embodiment, the match vectors, $G_i$, are added to the local database whenever they are fetched from one or more remote databases, thereby augmenting the local database. Note that in this case, the parametric information for audio objects that are identified in the audio stream is either provided from the remote database and stored locally, or it is computed directly from the identified audio objects and stored locally for later use in identifying other repeat copies of the audio objects. In still another related embodiment, periodic updates are fetched from one or more remote databases to augment the usefulness of the local database.

Finally, in still another embodiment, one or more local or remote databases maintain parametric information and at least partial match vectors, $G_i$, for unidentified audio objects. While unidentified audio objects can not be positively identified using this information, the information is still useful for identifying repeat instances of an audio object. As noted above, where more then one copy of an audio object such as a song is available, the multiple copies can be used for determining and storing a better copy, correcting imperfections in one or more copies of the audio object, or simply keeping statistics on the number of occurrences and time of play for the unidentified repeat objects.

Further, in a related embodiment, any audio which can not be automatically identified is stored on a computer readable medium. In this embodiment, a user interface for accessing and manually identifying the unidentified audio is provided. This user interface allows a user to manually segment portions of the audio stream, and provide any additional detailed information available to the user such as audio object title and artist information. In addition, once manually segmented by the user, the duration of the audio object is easily computed from the manually segmented object by simply determining the length of the segmented audio data. Given this information, the manually identified audio object is then treated the same as an automatically identified object. Further, the parametric and detailed information for characterizing the manually identified audio object is then made available to the object database for use in future automatic identifications of repeat instances of the manually identified audio object.

2.3 Initial Object Comparisons

Once the audio stream has been sampled and filtered as described above, parametric information for characterizing the current window or windows of the audio stream is computed and used in a database query or search to identify potential object matches with previously identified probable objects. The purpose of the database query is simply to determine whether a portion of the audio stream comprising one or more segments or windows of the audio stream is approximately the same as a known or previously identified audio object.

In particular, processing the audio stream begins by applying a set of at least one filter to the current window of the stored or buffered audio stream. This set of filters provides a suite of algorithms for targeting particular aspects of the audio stream for producing representative information about the window or segment currently being processed. In other words, given K filters, there is vector of representative outputs $F_j = (f_{j0}, f_{j1}, f_{j2}, \ldots, f_{jK-1})$, for the $j^{th}$ window of the audio stream. Thus, for any given window or group of contiguous windows of the audio stream, the set of at least one filter produces a vector of outputs comprised of characteristic information that represents the audio data for that portion of the audio stream. This output vector is then used to identify potential audio object matches by checking the database for potential matches.

As noted above, the aforementioned suite of algorithms for targeting particular aspects of the audio stream employs one or more filters or algorithms for computing parametric information useful for identifying audio objects in the audio stream. This parametric information includes parameters that are useful for identifying particular audio objects, and thus, the type of parametric information computed is dependent upon the type of audio object being sought. As is well known to those skilled in the art, there are a large number of conventional frequency, time, and energy-based techniques that are useful for comparing the similarity of audio objects. For example, the elements representing the output vector for a song-type audio object includes, but is not limited to, information, such as, for example, beats per minute (BPM), energy occupancy of various frequency bands, zero-crossings, etc., as estimated or calculated over each current window or segment.

There are various ways of computing an approximate BPM. For example, in a working example of the repeating object extractor, the audio stream is filtered and down-sampled to produce a lower dimension version of the original stream. In a tested embodiment, filtering the audio stream to produce a stream that contains only information in the range of 0-220 Hz was found to produce good BPM results. However, it should be appreciated that any frequency range can be examined depending upon what information is to be extracted from the audio stream. Once the stream has been filtered and down-sampled, a search is then performed for dominant peaks in the low rate stream using autocorrelation of windows of approximately 10-seconds at a time, with one or more of the largest peaks being retained as BPM data for use in the initial comparison to audio objects in the database. Note that in one embodiment, spurious BPM numbers are eliminated using median filtering.

As noted above, once computed, the output vector is passed to the database to determine which, if any, entries are possible matches. For example, when identifying songs in an audio stream, assuming element $f_{j0}$ represents BPM, and that for the current window $f_{j0}=112.7$ and has been approximately constant (i.e., $f_{j-10}=f_{j-20}=\ldots=112.7$) for a period of 3.4 minutes, than all songs in the database that do not have approximately this BPM, for at least that measured duration, are not considered to be potential matches. Conversely, those entries that do have a BPM of approximately 112.7, for at approximately 3.4 minutes, are considered to be potential matches, and are returned for further comparison as described in detail below. Similarly, when the output vector, $F_j$, contains other elements, i.e., energy occupancy of various frequency bands, zero-crossings, etc., each of these elements is used to further thin the list of possible or potential matches. It is also possible that $F_j$ consists of elements that do not have simple physical interpretations.

Note that in alternate embodiments, the number of potential matches returned by the database query is limited to a desired maximum in order to reduce system overhead. Further, a similarity threshold for comparison of current window or segment of the audio stream with objects in the database is adjustable via a user interface in order to either increase or decrease the likelihood of identifying potential matches. This serves to either limit or increase the number of possible matches returned from the database. In yet another related embodiment, those objects found to repeat more frequently within an audio stream are weighted more heavily so that they are more likely to be identified as a potential match than those objects that repeat less frequently. In still another embodiment, if too many potential matches are returned by the database search, then the similarity threshold is increased so that fewer potential matches are returned.

In another embodiment, if the search for potential matches in the database provide potential match which is sufficiently close to the output vector, $F_j$, then that potential match will be considered to be an actual match, and the more detailed comparison to the other potential matches will not be performed.

2.4 Detailed Comparisons of Possible Matches

In general, once the potential matches to the portion of the audio stream currently being analyzed have been returned by the database, a more detailed comparison between the current portion of the audio stream and one or more of the potential matches are performed to more positively identify the current portion of the audio stream. In general, this detailed comparison involves performing a cross-correlation of the current portion of the audio stream with one or more of the potentially matching audio objects returned from the object database. This detailed comparison is described in further detail below. At this point, if the current portion of the audio stream is found to match one of the potential matches, it is identified and the extents of the audio object within the audio stream are determined based on the cross-correlation and an alignment of the current portion of the audio stream with the matching audio object, along with the duration data provided by the match vector. Once the extents of the audio object have been determined, the audio object is simply extracted from the audio stream and saved to an individual file as noted above. Alternately, once the extents of the audio object are known, the position of the audio object within the stream is saved to the database.

In particular, when the initial search, i.e., the initial object comparisons, identifies possible candidates that approximately match the output vector, a vector $G_i$ is returned for each possible match in the database. This "match vector," $G_i$ contains information such as, for example, a low-dimension version of the audio object, the duration of the audio object, and other pertinent quantities such as title and artist information. Note that both $F_j$ (the output vector), and $G_i$ (the match vector), are generally small vectors in comparison with the size of an audio object, even when the audio object is stored in a compressed format.

For each match vector, $G_i$, a cross-correlation of the low-dimension version of the audio object is performed with the appropriate section of audio from the audio stream which has been filtered or otherwise processed to provide a corresponding low-dimension version of that portion of the audio stream. Note that in one embodiment, a cross-correlation between full-dimension versions of the known audio object and the current portion of the audio stream is performed. However, using full-dimension versions for comparison of the audio objects to the audio stream tends to provide less reliable results, especially where the audio stream has been corrupted by noise. In either case, a high correlation denotes a match, and provides alignment information, that, when considered with the audio object duration information, allows for a more exact determination of the boundaries of the audio object in the stream. Once a match is identified, and the boundaries determined, in alternate embodiments, the object or object location is stored, and statistics regarding play of the audio object are maintained.

In one embodiment, each $G_i$ is compared against the target portion of the audio stream in order of decreasing probability of match until a match is identified. Thus, prior information, such as the most recently identified audio objects from the same audio stream, is used to decrease the computation required. For example if a song of one genre was the most recently identified it is more probable that a song of the same genre is currently being played. Consequently, a higher probability will be assigned to possible song matches of the same genre than to possible song matches of different genres. Similarly, if an advertisement was just identified in the audio stream, it is more probable that the next contiguous segment of the audio stream is also an advertisement.

In another embodiment, once a positive match has been found, the search terminates, the segmentation is completed, and the audio object is stored along with its meta-data. Alternately, the starting and ending points of the audio object within the audio stream is stored in a file or database so that the audio object can be accessed as desired. If an identified audio object has already been stored it need not be stored again. However, if the existing stored copy is imperfect, for example being cropped or marred in some way, such as by crossfading, voiceovers, or other noise, the newly identified copy is stored in place of the previously stored audio object, if it is determined to be a better, clearer, or more complete copy. Alternately, in still another embodiment, each copy, or pointers to the location of each copy in the audio stream are stored individually.

In still another embodiment, two or more copies of an audio object are combined to produce an improved version of the object. For example, if a stored copy of object S is cropped (missing some seconds at beginning and end) and there is a voiceover on part of it, a second copy S' can be used to produce an improved version $S_{improved}=f(S, S')$ where f(.) involves some audio processing. The initial determination that S is imperfect is readily done by comparing it with S'. For example, it is difficult to determine whether a voiceover is a part of the song or not based merely on examining the audio data of S, but a comparison with another version of the song, i.e., S', reveals parts that are not common to both. These parts are assumed to be noise or corruption such as voiceovers or crossfading.

In a further embodiment, if the detailed comparison shows that the current portion of the audio stream does not match any of the potential matches, it is identified as part of a new audio object in the database, and its position within the stream and parametric information is saved to the database as noted above. Alternately, as noted above, this unidentified audio is also made available to a user via a user interface for manual segmentation and identification. Note also that the extents of any such unknown or unidentified audio can be determined by identifying audio objects existing on either side of the unidentified audio within the stream. However, in still another embodiment, if the current window or segment is not identified, a new database search is made using a lower similarity threshold to identify additional audio objects for comparison. Again, if the current window or segment is identified, it is treated as described above; otherwise, it is added to the database as a new audio object, also as described above.

In one embodiment the vector $G_i$ is a low dimension version of the database object computed using the Bark spectra decomposition (also known as critical bands). This decomposition is well known to those skilled in the art. This decomposes the signal into a number of different bands. Since they occupy narrow frequency ranges the individual bands can be sampled at much lower rates than the signal they represent. The vector $G_i$ can consist of sampled versions of one or more of these bands. For example, in one embodiment the vector $G_i$ consists of a sampled version of Bark band 7 which is centered at 840 Hz.

In another embodiment determining that the target portion of the audio stream matches an element in the database is done by calculating the cross-correlation of $G_i$ (the low dimension version of the database object) with the low dimension version of the target portion of the audio stream. A peak in the cross correlation generally implies that two waveforms are approximately equal for at least a portion of their lengths. As is well know to those skilled in the art there are various techniques to avoid accepting spurious peaks. For example, if a particular local maximum of the cross-correlation is a candidate peak, we may require that the value at the peak is more than a threshold number of standard deviations higher than the mean in a window of values surrounding (but not necessarily including) the peak.

In yet another embodiment the extents of the found object is determined by aligning two or more copies of repeating objects. For example, once a match has been found (by detecting a peak in the cross-correlation) the low dimension version of the target portion of the audio stream and $G_i$ (which is a low dimension version of a database entry) are aligned. The amount by which they are misaligned is determined by the position of the cross-correlation peak. One of the low dimension versions is then normalized so that their values approximately coincide. That is, if the target portion of audio is S, and it has been determined from the cross-correlation that $G_i$ and S match with offset o, then S(t), where t is the temporal position within the audio stream, is compared with $G_i(t+o)$. However a normalization may be necessary before S(t) is approximately equal to $G_i(t+o)$. Next the beginning point of the object is determined by finding the smallest $t_b$ such that S(t) is approximately equal to $G_i(t+o)$ for $t>t_b$. Similarly the endpoint of the object is determined by finding the largest $t_e$ such that S(t) is approximately equal to $G_i(t+o)$ for $t<t_e$. Once this is done S(t) is approximately equal to $G_i(t+o)$ for $t_b<t<t_e$ and $t_b$ and $t_e$ can be regarded as the approximate endpoints of the object. In some instances it may be necessary to filter the low dimension versions before determining the endpoints.

In one embodiment, determining that S(t) is approximately equal to $G_i(t+o)$ for $t>t_b$ is done by a bisection method. A location to is found where $S(t_0)$ and $G_i(t_0+o)$ are approximately equal, and $t_1$ where $S(t_1)$ and $G_i(t_1+o)$ are not equal, where $t_1<t_0$. The beginning of the object is then determined by comparing small sections of S(t) and $G_i(t+o)$ for the various values of t determined by the bisection algorithm. The end of the object is determined by first finding to where $S(t_0)$ and $G_i(t_0+o)$ are approximately equal, and $t_2$ where $S(t_2)$ and $G_i(t_2+o)$ are not equal, where $t_2>t_0$. Finally, the endpoint of the object is then determined by comparing sections of S(t) and $G_i(t+o)$ for the various values of t determined by the bisection algorithm.

In still another embodiment, determining that S(t) is approximately equal to $G_i(t+o)$ for $t>t_b$ is done by finding to where $S(t_0)$ and $G_i(t_0+o)$ are approximately equal, and then decreasing t from to until S(t) and $G_i(t+o)$ are no longer approximately equal. Rather than deciding that S(t) and $G_i(t+o)$ are no longer approximately equal when their absolute difference exceeds some threshold at a single value of t, it is generally more robust to make that decision when their absolute difference has exceeded some threshold for a certain minimum range of values, or where the accumulated absolute difference exceeds some threshold. Similarly the endpoint is determined by increasing t from $t_0$ until S(t) and $G_i(t+o)$ are no longer approximately equal.

2.5 System Architecture

Figure 2:
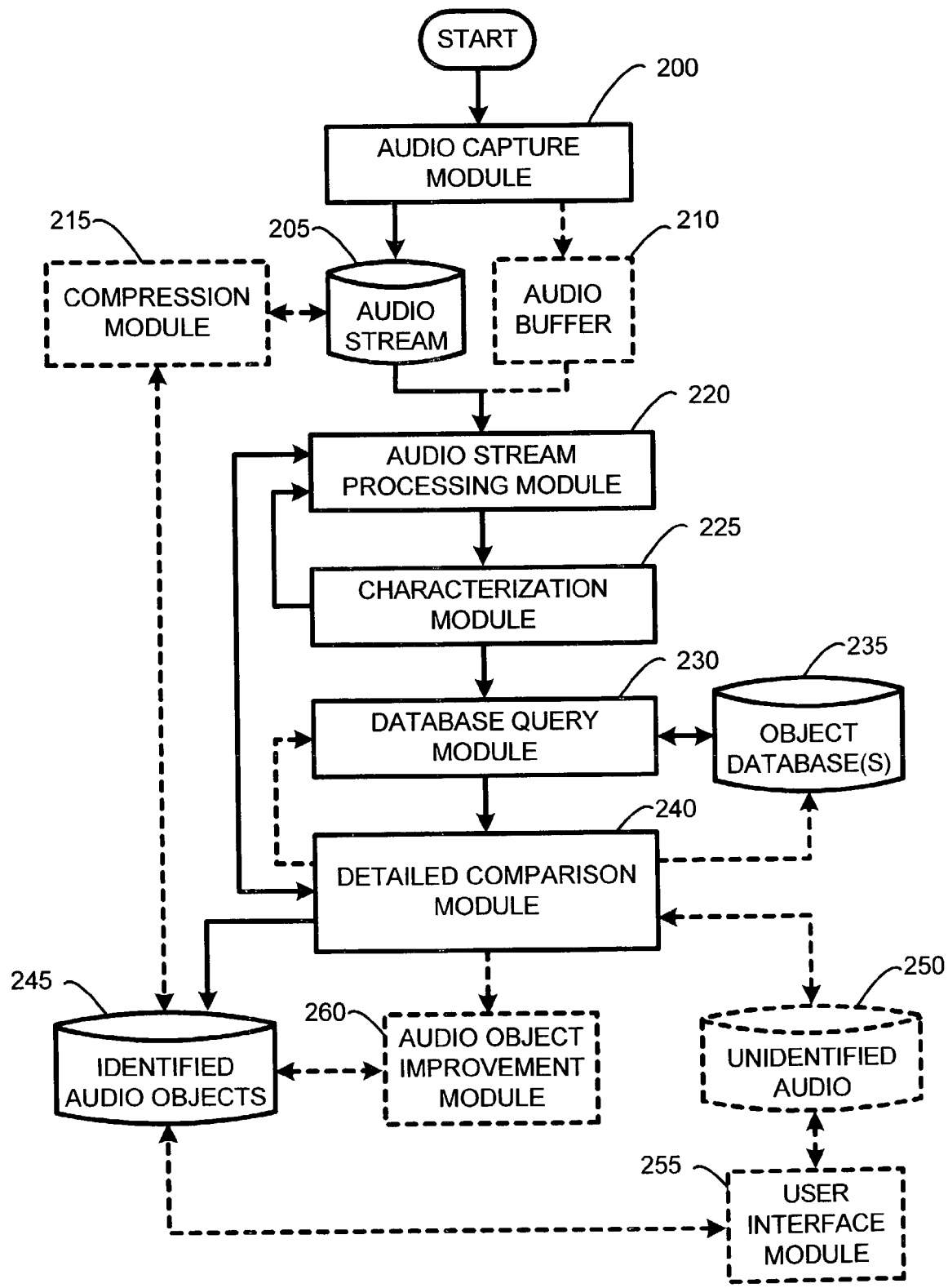
FIG. 2 illustrates an exemplary architectural diagram showing exemplary program modules for automatically identifying and segmenting audio objects in an audio stream.

The general system diagram of FIG. 2 illustrates the processes described above. In particular, the system diagram of FIG. 2 illustrates interrelationships between program modules for implementing a "repeating object extractor" for automatically identifying and segmenting songs, music, and other audio objects in an audio stream. It should be noted that the boxes and interconnections between boxes that are represented by broken or dashed lines in FIG. 2 represent alternate embodiments of the invention, and that any or all of these alternate embodiments, as described below, may be used in combination with other alternate embodiments that are described throughout this document.

In particular, as illustrated by FIG. 2, a system and method for automatically identifying and segmenting songs, music, and other audio objects in an audio stream begins by using an audio capture module 200 for capturing one or more audio streams containing audio information. The audio stream 205 is captured using any of a number of conventional techniques, such as, for example, an audio capture device connected to a computer for capturing a radio, television, Internet or other network audio broadcast stream.

Such audio stream capture techniques are well known to those skilled in the art, and will not described herein. Once captured, the audio stream 205 is stored in a computer file or database, or buffered in an audio buffer 210 for a period of time, typically several minutes or longer, sufficient to allow for identification and segmentation of the audio stream as described above. In one embodiment, the audio stream 205 is also compressed by a compression module 215 using conventional audio compression techniques such as, for example, MPEG-3 compression.

An audio stream processing module 220 then begins examining the audio stream, either stored or buffered, 205 or 210, respectively. In particular, starting with the beginning of the audio stream, the audio stream processing module 220 begins providing segments or windows of the audio stream to a characterization module 225 for computing the parametric information comprising the output vector, $F_j$, as described above. In one embodiment, the length of each window or segment is adjustable. However, windows or segments on the order of about 20 seconds are typically used. In one embodiment so long as the output vector, $F_j$, is approximately constant from one segment to the next, it is assumed that contiguous segments or windows of the audio stream belong to the same audio object. As soon as a discontinuity is observed in the output vector, $F_j$, it is assumed that an audio object boundary or endpoint has been crossed, and the values of the output vector, $F_j$, prior to observing the discontinuity, are passed to a database query module 230 which then queries the object database 235 in order to identify potential matches to the portion of the audio stream being examined.

Note that exact matches are not required, or even expected, in order to identify potential matches during the database query. In fact, in one embodiment, a similarity threshold for performing this initial search for potential matches is used. This similarity threshold, or "detection threshold", can be set to be any desired percentage match between one or more features of the output vector $F_j$, and the parametric information characterizing each of the potential matches. In another embodiment, if either no potential matches, or too few potential matches are identified, then the detection threshold is lowered in order to increase the number of potential matches identified by the database query module 230. Conversely, in still another embodiment, if too many potential matches are identified, then the detection threshold is raised so as to limit the number of comparisons performed. Further, in a related embodiment, if the percentage match between the output vector, $F_j$ and the parametric information for characterizing any of the potential matches is sufficiently high, then that potential match will be considered to be an actual match, and the more detailed comparison to the other potential matches (i.e. module 240, as described below) will not be performed.

In another embodiment, every segment of the audio stream, 205 or 210, is used by the database query module 230 to query the object database 235. In this embodiment, as soon as the output vector, $F_j$, is computed for each segment by the characterization module 225, the output vector, $F_j$, is provided to the database query module 230 for querying the object database 235 to locate potential matches as described above. However, this embodiment is computationally more expensive, as more database queries are performed than the aforementioned embodiment where the output vector, $F_j$, represents multiple segments or windows of the audio stream 205 or 210. In addition, while still useful, because shorter portions of the audio stream 205 or 210 are used in this embodiment, it is more likely that erroneous or incorrect matches will be identified, and testing them will require additional computation.

Once one or more potential matches have been identified, the match vector, $G_i$, as described above, is returned from the object database 235 for each potential match. A detailed comparison module 240 then uses the match vector, $G_i$, to perform a detailed comparison between the portion of the audio stream being analyzed and one or more of the potentially matching objects. This detailed comparison includes either a direct comparison of the current portions of the audio stream and the potential matches, or a comparison between a lower-dimensional version of the current portion of the audio stream and the potential matches. As discussed above, this comparison typically involves a search for peaks in a cross-correlation between the current portion of the audio stream and a version of at least one audio object representing a potential match.

Next, once the detailed comparison module 240 has identified a match to the portion of the audio stream being analyzed, the detailed comparison module continues by aligning the portion of the audio stream being analyzed to the matching audio object using the cross-correlation peaks. The detailed comparison module then uses the duration information provided by the match vector, $G_i$, to identify the nominal extents of the identified audio object. In one embodiment, these extents are saved as endpoint information to the object database 235. In addition, in another embodiment, the occurrence of a match is also saved to the object database 235 for use in tracking statistical information for identified audio objects as described above. In an alternate embodiment, any identified audio objects 245 are stored to a computer readable medium for later use. Note that in a related embodiment, the stored identified audio objects 245 are compressed using the compression module 215.

In one embodiment, whenever any portion of the audio stream, 205 or 210, cannot be identified, those unidentified audio portions 250 are saved to a computer readable medium for later manual browsing, classification, or identification via a user interface module 255. In another embodiment, this user interface module 255 also provides for access to the stored identified audio objects 245, as well as allowing a user to manually identify or compare unknown or unidentified audio portions 250 to identified audio objects 245.

Finally, in still another embodiment, as described above, where two or more copies of an audio object such as a song have been identified, an audio object improvement module 260 is used to combine one or more versions of the audio object to produce an improved version of the audio object.

The processes described above are repeated, with the portion of the audio stream, 205 or 210, which is being analyzed by the characterization module 225 being incremented, such as, for example, by using a sliding window, or by moving the beginning of the window to the computed endpoint of the last identified audio object. These processes continue until such time as the entire audio stream has been examined, or until a user terminates the examination via the user interface module 255.

3.0 Operation Overview

As noted above, the program modules described in Section 2.6 with reference to FIG. 2, and in view of the detailed description provided in Section 2, are employed in a "repeating object extractor" for automatically identifying and segmenting songs, music, and other audio objects in an audio stream. This process is depicted in the flow diagram of FIG. 3. It should be noted that the boxes and interconnections between boxes that are represented by broken or dashed lines in FIG. 3 represent alternate embodiments of the present invention, and that any or all of these alternate embodiments, as described below, may be used in combination.

3.1 System Operation

Figure 3:
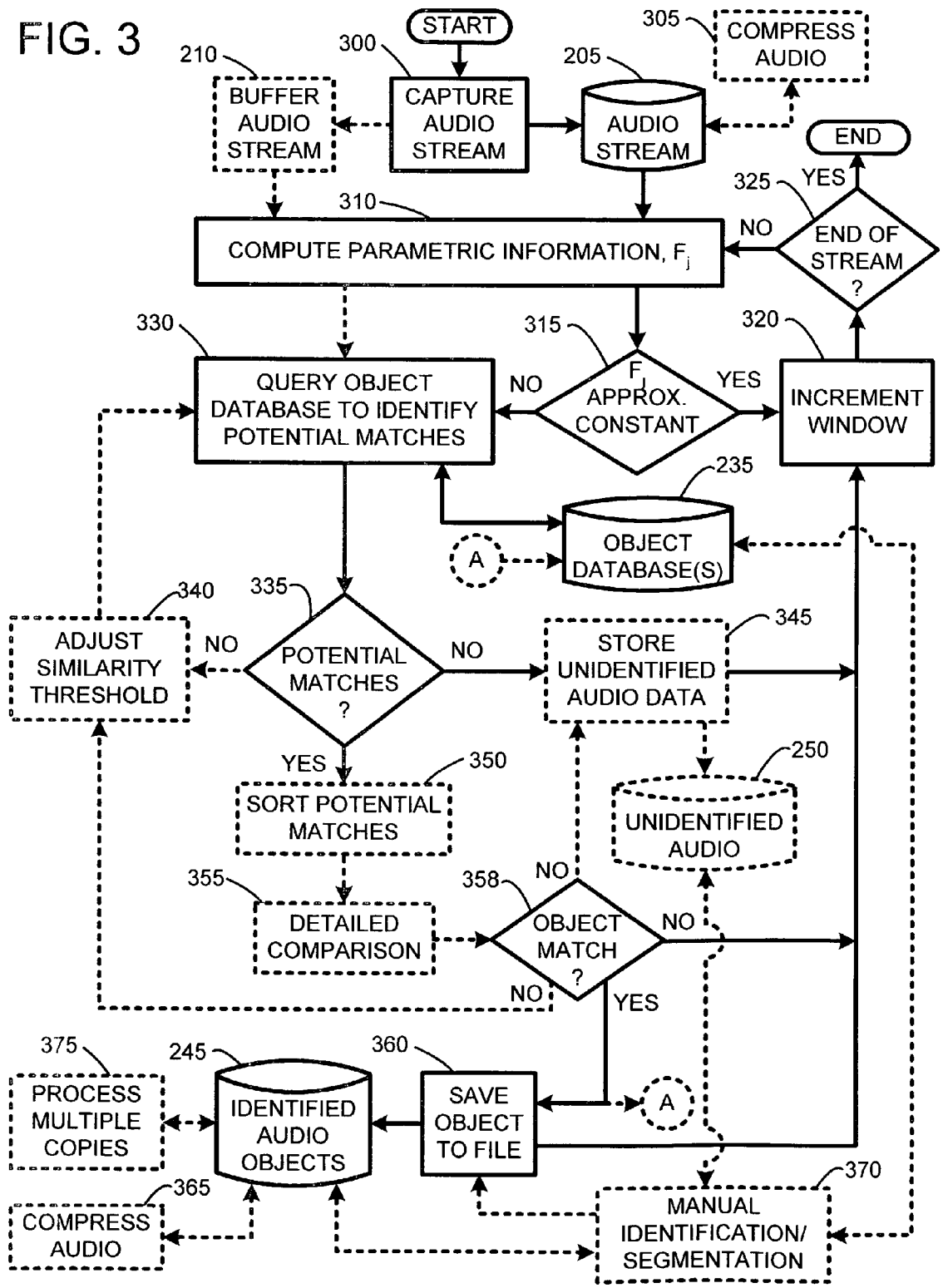
FIG. 3 illustrates an exemplary system flow diagram for automatically identifying and segmenting audio objects in an audio stream.

Referring now to FIG. 3 in combination with FIG. 2, the process can be generally described as a repeating object extractor that locates, identifies and segments audio objects such as songs, music, station identifiers, jingles, and advertisements from an audio stream. In particular, as illustrated by FIG. 3, a system and method for automatically identifying and segmenting audio objects in an audio stream begins by capturing 300 an audio stream 205. The audio stream 205 is captured using any of a number of conventional techniques, such as, for example, an audio capture device connected to a computer for capturing a radio, television, Internet or other network audio broadcast stream. Such audio stream capture techniques are well known to those skilled in the art, and will not described herein. Once captured, the audio stream 205 is stored in a computer file or database, or buffered 210 for a period of time, usually several minutes, sufficient to allow for identification and segmentation of the audio stream as described above. In one embodiment, the audio stream 205 is compressed 305 using conventional audio compression techniques.

Once the audio stream has been captured or buffered, 205 or 210, respectively, parametric information describing the audio stream is computed 310. In particular, starting with the beginning of the audio stream 205 or 210, segments or windows of the audio stream are analyzed using a set of K filters to generate a vector of representative outputs $F_j$, as described above. As noted above, while the length of each window or segment is adjustable, windows or segments on the order of about 20 seconds are typically used in cases where the audio stream, 205 or 210, represents songs or music.

In one embodiment, so long as the output vector, $F_j$, is approximately constant 315 from one segment to the next, it is assumed that contiguous segments or windows of the audio stream belong to the same audio object and the window or segment is incremented 320 and $F_j$ is recomputed 310 for the additional segment. Incrementing of the windows or segments continues until either the end of the audio stream, 205 or 210, is reached 325, or until a user terminates the operation. In other words, the portion of the audio stream, 205 or 210, for which $F_j$ is being computed 310, grows as a function of time so long as $F_j$ is approximately constant 315. As soon as a discontinuity is observed in the output vector, $F_j$, it is assumed that an audio object boundary or endpoint has been crossed. At this point, the values of the output vector, $F_j$, prior to observing the discontinuity, are used to query 330 the object database 235 in order to identify potential matches 335 to the portion of the audio stream being examined.

In yet another embodiment, every segment of the audio stream, 205 or 210, is used to query 330 the object database 235. In this embodiment, as soon as the output vector, $F_j$, is computed 310 for each segment, the output vector, $F_j$, is provided for querying 330 the object database 235 to locate potential matches as described herein. However, this embodiment is computationally more expensive, as more database queries 330 are performed than with the aforementioned embodiment where the output vector, $F_j$, represents multiple segments or windows of the audio stream 205 or 210. In addition, while still useful, because shorter portions of the audio stream 205 or 210 are used in this embodiment, it is more likely that erroneous or incorrect matches will be identified.

In another embodiment, the vector $F_j$ for every segment of the audio stream, or for some subset of segments of the audio stream are added to the database to allow future identification of objects that repeat in the stream, but which are as yet not in the database.

In either case, as noted above, when querying 330 the object database 235, exact matches are not required, or even expected, in order to identify potential matches. In fact, in one embodiment, if either no potential matches 335, or too few potential matches are identified, then an adjustable similarity threshold is adjusted lower 340 in order to increase the number of potential matches identified by the database query 330. Conversely, in still another embodiment, if too many potential matches 335 are identified, then the similarity threshold is adjusted higher 340 so as to limit the number of detailed comparisons performed as described herein. However, in a related embodiment, in the event that exact, or nearly exact potential matches are identified between the output vector, $F_j$, and the parametric information for characterizing any of the potential matches, then that potential match will be considered to be an actual match, and the more detailed comparison to the other potential matches (i.e., detailed comparison 355, as described below) will not be performed.

In one embodiment, those portions of the audio stream for which no potential match is identified 335 are stored 345 in a file or database of unidentified audio data 250. As described herein, this unidentified audio data 250 can then be manually segmented, identified, or processed via a user interface. However, once one or more potential matches have been identified 335, the match vector, $G_i$, is returned from the object database 235 for each potential match. In another embodiment, these match vectors are sorted 350 in order of probability of match, such that those match vectors having a higher probability of match are compared to the portion of the audio stream being analyzed prior to those match vectors having a lower probability of match.

Given one or more potentially matching audio objects, a detailed comparison 355 between the current portions of the audio stream, 205 or 210, and one or more of the potentially matching objects is performed using the match vectors, $G_i$, for each potentially matching object. This detailed comparison 355 includes either a direct comparison of the current portions of the audio stream, 205 or 210, and the potential matches, or a comparison between a lower-dimensional version of the current portion of the audio stream and the potential matches. As discussed above, this comparison 355 typically involves a search for peaks in a cross-correlation between the current portion of the audio stream and a version of at least one audio object representing a potential match.

When identifying matches, this detailed comparison 355 also aligns the portion of the audio stream being analyzed to the matching audio object using the cross-correlation peaks. This alignment allows the duration information provided by the match vector, $G_i$, to be used to identify the nominal extents of the identified audio object. Consequently, in one embodiment, once an object match has been identified 358 and its nominal extents determined by the detailed comparison 355, the extents are saved as endpoint information to the object database 235. In another embodiment, the occurrence of a match 358 is also saved to the object database 235 for use in tracking statistical information for identified audio objects as described above. Further, once the nominal extents of the identified audio object are determined during the detailed comparison 355, the identified audio object is extracted from the audio stream and saved 360 to a computer readable file or database 245 for later use. Note that in a related embodiment, the stored identified audio objects 245 are compressed 365 using conventional audio compression techniques.

Further, in still another embodiment, whenever the detailed comparison 355 fails to identify any portion of the audio stream, 205 or 210, those unidentified audio portions are stored 345 to a computer readable file or database 250 for later manual browsing, classification, segmentation or identification 370 via a user interface. In addition, in still another embodiment, whenever the detailed comparison 355 fails to identify any portion of the audio stream, 205 or 210, the similarity threshold 340 is adjusted, and a new database query 330 is performed in an attempt to identify additional potentially matching audio objects.

In still another embodiment, as described above, where two or more copies of an audio object such as a song have been identified, the multiple copies of the audio object are processed 375 to combine one or more versions of the audio object to produce an improved version of the audio object. The improved version is then used to replace one or more of the previously saved versions of the audio object 245.

Finally, as noted above, the aforementioned processes are repeated, while the portion of the audio stream, 205 or 210, which is being examined, is repeatedly incremented 320 until such time as the entire audio stream has been examined 325, or until a user terminates the examination.

4.0 Additional Embodiments

As noted above, audio streams captured for purposes of segmenting and identifying audio objects in the audio stream can be derived from any conventional broadcast source, such as, for example, an audio or audio/video broadcast via radio, television, the Internet, or other network. With respect to a combined audio/video broadcast, as is typical with television-type broadcasts, it should be noted that the audio portion of the combined audio/video broadcast is synchronized with the video portion. In other words, as is well known, the audio portion of an audio/video broadcast coincides with the video portion of the broadcast. Consequently, identifying repeating audio objects within the combined audio/video stream is a convenient and computationally inexpensive way to identify repeating video objects within the audio/video stream.

In particular, in one embodiment, by first identifying repeating audio objects in the audio stream, identifying the times $t_b$ and $t_e$ at which those audio objects begin and end (i.e., the endpoints of the audio object), and then segmenting the audio/video stream at those times, video objects are also identified and segmented along with the audio objects from the combined audio/video stream. For example, a typical commercial or advertisement is often seen to frequently repeat on any given day on any given television station. Recording the audio/video stream of that television station, then processing the audio portion of the television broadcast will serve to identify the audio portions of those repeating advertisements. Further, because the audio is synchronized with the video portion of the stream, the location of repeating advertisements within the television broadcast can be readily determined in the manner described above. Once the location is identified, such advertisements can be flagged for any special processing desired.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A physical computer-readable medium having computer executable instructions encoded thereon for identifying audio objects within an audio stream, comprising:
   capturing an audio stream;
   computing at least one parameter for characterizing at least one portion of the audio stream;
   identifying potentially matching identified audio objects for each portion of the audio stream by comparing the at least one parameter for each portion of the audio stream to known parameters in at least one database of identified audio objects;
   comparing at least one of the potentially matching identified audio objects to the at least one portion of the audio stream to determine whether the at least one portion of the audio stream matches one of the potentially matching identified audio objects;
   when one of the potentially matching identified audio objects is determined to a match to the at least one portion of the audio stream, identifying an audio object within the audio stream by assigning the identity of the matching identified audio object to the at least one portion of the audio stream; and
   determining extents of the audio object identified in the audio stream, and wherein determining extents of the audio object identified includes determining endpoints for the audio object.

2. The computer-readable medium of claim 1 wherein comparing at least one of the potentially matching identified audio objects to the at least one portion of the audio stream comprises performing a cross-correlation between at least one portion of the audio stream and at least one of the potentially matching identified audio objects.

3. The computer-readable medium of claim 2 further comprising aligning the at least one portion of the audio stream to a matching identified audio object by aligning peaks located during the cross-correlation of the at least one portion of the audio stream and the matching identified audio object.

4. The computer-readable medium claim 3 wherein identifying endpoints of each audio object further comprises tracing backwards and forwards through the audio stream in the aligned portions of the audio stream and the matching identified audio object to determine locations within the audio stream where the aligned portions of the audio stream and the matching identified audio object are still approximately equivalent.

5. The computer-readable medium of claim 2 further comprising:
   aligning cross-correlation peaks of the matching identified audio object and the at least one portion of the audio stream; and
   wherein determining extents of the audio object identified within the audio stream comprises using audio object duration information provided by the at least one database of identified audio objects in combination with the aligned cross-correlation peaks to determine the extents of the audio object identified in the audio stream.

6. The computer-readable medium of claim 1 wherein determining the extents of the audio object identified in the audio stream comprises aligning cross-correlation peaks identified when comparing at least one of the potentially matching identified audio objects to the at least one portion of the audio stream and using audio object duration data provided by the object database to segment identified audio objects from the audio stream.

7. The computer-readable medium of claim 1 wherein audio objects within the stream include any of songs, music, advertisements, station identifiers, speech, and emergency broadcast signals.

8. The computer-readable medium of claim 1 wherein capturing the audio stream comprises receiving and storing a broadcast audio stream.

9. The computer-readable medium of claim 1 wherein capturing the audio stream comprises receiving and buffering a broadcast audio stream.

10. The computer-readable medium of claim 1 wherein comparing the at least one parameter for each portion of the audio stream to the known parameters in the at least one database of identified audio objects includes comparing the duration over which the at least one parameter is approximately constant over two or more consecutive portions of the audio stream to known parameter durations in the at least one database of identified audio objects.

11. The computer-readable medium of claim 1 wherein consecutive portions of the audio stream, over which the at least one parameter for characterizing the at least one portion of the audio stream is approximately constant, are combined into the at least one portion of the audio stream prior to comparing the at least one parameter for each portion of the audio stream to the known parameters in the at least one database of identified audio objects.

12. The computer-readable medium of claim 1 wherein identifying potentially matching identified audio objects for each portion of the audio stream comprises searching the object database to identify known audio objects having at least one parameter that is approximately similar to the at least one parameter for at least one portion of the audio stream.

13. The computer-readable medium of claim 1 wherein comparing the at least one of the potentially matching identified audio objects to the at least one portion of the audio stream comprises comparing a low-dimensional version of the at least one portion of the audio stream to a low-dimensional version of at least one of the potentially matching identified audio objects.

14. The computer-readable medium of claim 1 further comprising:
   segmenting the audio object identified within the audio stream from the audio stream; and
   storing the segmented audio object in a computer readable file.

15. The computer-readable medium of claim 1 wherein the endpoint information is stored in at least one database.

16. The computer-readable medium of claim 1 wherein the audio stream is part of an audio/video broadcast stream.

17. The computer-readable medium of claim 16 wherein determining the extents of the audio object identified in the audio stream serves to identify the extents of a corresponding video object within a video part of the audio/video stream.

18. A method for automatically identifying songs in an audio stream comprising:
   acquiring at least one audio stream;
   computing a vector of at least one parameter for characterizing at least one windowed segment of the at least one audio stream as a function of time;
   querying a database of known songs to determine which songs therein have at least one parameter that is similar to the vector for the at least one windowed segment of the at least one audio stream;
   returning a detailed vector of parametric information from the database for each similar song identified in the database;
   automatically identifying at least one song in the at least one audio stream by comparing the detailed vector for at least one similar song to the at least one windowed segment of the audio stream;
   determining extents of any song identified in the at least one audio stream; and
   wherein determining extents of any song includes determining start and end times for the song.

19. The method of claim 18 wherein acquiring the at least one audio stream further comprises buffering the at least one audio stream for a period of time on the order of an average length of songs expected in the at least one audio stream.

20. The method of claim 18 wherein acquiring the at least one audio stream further comprises storing the at least one audio stream to a computer readable medium.

21. The method of claim 20 further comprising compressing at least one of the stored audio streams.

22. The method of claim 18 further comprising locating discontinuities in the vector of at least one parameter for characterizing at least one windowed segment of the at least one audio stream as possible song boundaries.

23. The method of claim 18 wherein the detailed vectors returned by the database query are sorted in order of decreasing likelihood of matching the at least one windowed segment of the at least one audio stream having similar parameters.

24. The method of claim 23 wherein the detailed vector for songs of the same genre as songs recently identified in the at least one audio stream are given a higher likelihood of matching than the detailed vector for songs of a different genre.

25. The method of claim 23 wherein the detailed vector for songs are given a higher likelihood of matching as a direct function of a number of times that matching songs have been identified in the at least one audio stream.

26. The method of claim 23 wherein comparing the detailed vector for at least one similar song to the at least one windowed segment of the at least one audio stream is performed in order of decreasing likelihood of match.

27. The method of claim 18 wherein comparing the detailed vector for at least one similar song to the at least one windowed segment of the at least one audio stream is terminated when a matching song is identified.

28. The method of claim 18 wherein the detailed vector contains parameters including any of a full-dimension version of the song, a low-dimension version of the song, a duration of the song, a title of the song, and artist information for the song; and
   wherein at least one of these parameters is used to identify matching songs identified in the at least one audio stream.

29. The method of claim 18 wherein determining extents of any song comprises aligning any song identified in the at least one audio stream with any matching song returned from the database and using duration information for the matching song returned from the database to determine start and end times for the song identified in the at least one audio stream.

30. The method of claim 18 wherein the start and end times are stored in at least one database.

31. The method of claim 30 wherein the start and end times are used to segment the song from the audio stream, and wherein the segmented song is stored in a computer readable medium.

32. The method of claim 31 wherein the segmented song is stored in a computer readable medium only if it is the first instance of the song identified.

33. The method of claim 31 wherein any repeat instances of any segmented song are compared against previously stored versions to check for imperfections in any stored repeat instance of a song.

34. The method of claim 31 wherein any repeat instances of any segmented song are combined to produce an improved version of the segmented song.

35. The method of claim 18 wherein at least one windowed segment of the audio stream which is not automatically identified is stored to a computer readable medium.

36. The method of claim 35 further comprising a user interface for accessing and manually identifying at least one windowed segment of the audio stream which is not automatically identified.

37. The method of claim 18 further comprising a database including any of:
   an order in which identified songs were played within the audio stream;
   a time in which identified songs were played within the audio stream; and
   a number of times in which identified songs were played within the audio stream.

38. The method of claim 18 wherein at least one audio stream is an audio radio broadcast stream.

39. The method of claim 18 wherein at least one audio stream is part of an audio/video television broadcast stream.

40. The method of claim 39 wherein video objects within the audio/video stream are coincident with the songs identified within the at least one audio stream.

41. The method of claim 18 wherein computing a vector of at least one parameter for characterizing at least one windowed portion of the at least one audio stream comprises computing at least one of:
   beats per minute;
   stereo information;
   energy ratio per audio channel; and
   energy content of pre-selected frequency bands.

42. The method of claim 41 wherein the pre-selected frequency bands correspond to at least one Bark band.

43. The method of claim 18 wherein comparing the detailed vector for at least one similar song to the at least one windowed segment of the audio stream comprises directly comparing at least one windowed segment of the at least one audio stream to at least one similar song to determine whether that segment matches at least a portion of any similar song.

44. The method of claim 18 wherein comparing the detailed vector for at least one similar song to the at least one windowed segment of the audio stream comprises comparing a low-dimensional version of at least one windowed segment of the at least one audio stream to a low-dimensional version of at least one similar song to determine whether that segment matches at least a portion of any similar song.

45. The method of claim 44 wherein the comparing the detailed vector to the at least one windowed segment comprises performing a cross-correlation between the detailed vector and the at least one windowed segment.

46. A computer-implemented process for jointly identifying and segmenting audio objects in an audio stream, comprising using a computing device to:
   compute characteristic information for at least one segment of an audio stream;
   analyze the characteristic information over consecutive segments to determine whether there is a discontinuity in the characteristic information;
   query a database of known audio objects to locate possible matches for at least one portion of the audio stream, wherein the at least one portion of the audio stream is comprised of at least one sequential segment of the audio stream wherein there are no discontinuities in the characteristic information;
   comparing at least one possibly matching audio object to corresponding portions of the audio stream to identify audio objects in the audio stream that actually match known audio objects in the database; and
   automatically aligning portions of the audio stream that match known audio objects to the matching known audio objects to determine temporal endpoints for each identified audio object in the audio stream, and wherein the temporal endpoints corresponding to the identified audio objects are stored on a physical computer readable medium.

47. The computer-implemented process of claim 46 wherein comparing at least one possibly matching audio object to corresponding portions of the audio stream comprises directly comparing the at least one possibly matching audio object to the corresponding portions of the audio stream to determine whether the corresponding portions of the audio stream actually matches at least a portion of any possibly matching audio object.

48. The computer-implemented process of claim 46 wherein comparing at least one possibly matching audio object to corresponding portions of the audio stream comprises comparing a low-dimensional version of the at least one possibly matching audio object to a low-dimensional version of the corresponding portions of the audio stream to determine whether the corresponding portions of the audio stream actually matches at least a portion of any possibly matching audio object.

49. The computer-implemented process of claim 46 wherein the audio objects are any of songs, music, advertisements, station identifiers, speech, and emergency broadcast signals.

50. The computer-implemented process of claim 46 wherein the audio stream is captured from a broadcast audio stream and stored to a computer readable medium prior to computing characteristic information for at least one segment of the audio stream.

51. The computer-implemented process of claim 46 wherein each identified audio object in the audio stream is stored to a computer readable medium.

52. The computer-implemented process of claim 46 wherein the temporal endpoints for each identified audio object in the audio stream is stored to a database.

53. The computer-implemented process of claim 46 wherein the audio stream is compressed and stored to a computer readable medium.

54. The computer-implemented process of claim 52 wherein each identified audio object in the audio stream is compressed.

55. The computer-implemented process of claim 46 wherein the database is located locally on a client computer.

56. The computer-implemented process of claim 55 wherein a larger remote database located on a remote server is queried when at least one portion of the audio stream cannot be identified using the local database.

57. The computer-implemented process of claim 56 wherein information retrieved from the remote database for comparison purposes is added to the local database.

58. The computer-implemented process of claim 55 wherein information is periodically retrieved from a remote audio object database for augmenting the local database.

59. The computer-implemented process of claim 46 wherein the audio stream is part of an audio/video broadcast stream.

60. The computer-implemented process of claim 59 wherein determining the temporal endpoints for each identified audio object in the audio stream serves to identify extents of a corresponding video object within a video part of the audio/video broadcast stream.

61. A method for automatically identifying media objects in an audio stream comprising using a computer to:
acquire at least one audio stream;
compute a vector of at least one parameter for characterizing at least one windowed segment of the at least one audio stream;
query a database of known audio objects to determine which audio objects therein have at least one parameter that is similar to the vector for the at least one windowed segment of the at least one audio stream;
specify that a known audio object is identified in the audio stream and is at least partially represented by the at least one windowed segment of the at least one audio stream when any of the known audio objects include parameters which are substantially equivalent to the at least one parameter for characterizing at least one windowed segment of the at least one audio stream;
return a detailed vector of parametric information from the database for each similar song identified in the database when none of the known audio objects include parameters which are substantially equivalent to the at least one parameter for characterizing at least one windowed segment of the at least one audio stream;
automatically identify at least one audio object in the at least one audio stream by comparing the detailed vector for at least one similar audio object to the at least one windowed segment of the audio stream when none of the known audio objects include parameters which are substantially equivalent to the at least one parameter for characterizing at least one windowed segment of the at least one audio stream;
determine extents of any audio object identified in the at least one audio stream, and store the extents of the identified audio objects to a physical computer readable medium;
wherein determining extents of any audio object identified in the at least one audio stream comprises aligning the at least one windowed segment of the at least one audio stream a matching known audio object by aligning peaks located during the cross-correlation; and
determining endpoints of any audio object identified in the at least one audio stream by tracing backwards and forwards through the at least one audio stream to determine locations within the at least one audio stream where the aligned at least one windowed segment of the at least one audio stream and the a matching known audio object audio object begin to diverge.

62. The method of claim 61 wherein acquiring the at least one audio stream further comprises buffering the at least one audio stream for a period of time on the order of several times the time it takes the average object in the stream to repeat.

63. The method of claim 61 further comprising compressing at least one of the audio streams.

64. The method of claim 61 further comprising locating discontinuities in the vector of at least one parameter for characterizing at least one windowed segment of the at least one audio stream as possible audio object boundaries.

65. The method of claim 61 wherein comparing the detailed vector for at least one similar song to the at least one windowed segment of the audio stream comprises directly comparing at least one windowed segment of the at least one audio stream to at least one similar audio object to determine whether that segment matches at least a portion of any similar audio object.

66. The method of claim 61 wherein comparing the detailed vector for at least one similar audio object to the at least one windowed segment of the audio stream comprises comparing a low-dimensional version of at least one windowed segment of the at least one audio stream to a low-dimensional version of at least one similar audio object to determine whether that segment matches at least a portion of any similar audio object.

67. The method of claim 61 wherein the comparing the detailed vector for at least one similar audio object to the at least one windowed segment of the at least one audio stream comprises performing a cross-correlation between the detailed vector and the at least one windowed segment.

68. The method of claim 61 wherein the at least one audio stream is part of an audio/video broadcast stream.

69. The method of claim 68 wherein determining the extents of any audio object identified in the at least one audio stream serves to identify the extents of a corresponding video object within a video part of the audio/video broadcast stream.

* * * * *